US 8,776,580 B2
Jul. 15, 2014

(12) United States Patent
e Souza et al.

(54) SYSTEM AND PROCESS FOR DETECTING LEAKAGE IN UMBILICALS

(75) Inventors: Luiz Antonio Lobianco e Souza, Rio de Janeiro (BR); Cláudio Soligo Camerini, Niterói (BR); Luis Claudio Sousa Costa, Niterói (BR); Alexandre Soares Rabelo, Rio de Janeiro (BR); William Albuquerque da Silva, Macaé (BR); Jorge Luiz Farias Brito, Rio de Janeiro (BR)

(73) Assignee: Petroleo Brasileiro S.A.—Petrobras, Rio de Janeiro (BR)

( * ) Notice: Subject to any disclaimer, the term of this patent is extended or adjusted under 35 U.S.C. 154(b) by 143 days.

(21) Appl. No.: 12/254,343

(22) Filed: Oct. 20, 2008

(65) Prior Publication Data

US 2009/0223283 A1    Sep. 10, 2009

(30) Foreign Application Priority Data

Mar. 5, 2008  (BR) .................................... 0800473

(51) Int. Cl.
  *G01R 33/02*  (2006.01)
  *G01M 3/28*  (2006.01)
(52) U.S. Cl.
  USPC ......................... 73/49.1; 73/40.5 R; 73/49.5
(58) Field of Classification Search
  USPC .................................................... 73/40–49.8
  See application file for complete search history.

(56) References Cited

U.S. PATENT DOCUMENTS

| | | | | |
|---|---|---|---|---|
| 3,508,433 A | * | 4/1970 | Bustin | 73/40.5 A |
| 3,691,819 A | * | 9/1972 | Guest | 73/40.5 A |
| 3,696,660 A | * | 10/1972 | Hubbard | 73/40.5 R |
| 3,903,730 A | * | 9/1975 | Matthews et al. | 73/40.5 R |
| 4,016,748 A | * | 4/1977 | Boyens | 73/40.5 R |
| 4,020,674 A | * | 5/1977 | Fechter et al. | 73/40.5 R |
| 4,485,668 A | * | 12/1984 | Hudson et al. | 73/40.5 A |
| 4,599,890 A | * | 7/1986 | Girone et al. | 73/37 |
| 4,894,539 A | * | 1/1990 | Hurst | 250/303 |
| 4,914,960 A | * | 4/1990 | Kordahi | 73/862.451 |
| 5,356,480 A | * | 10/1994 | Melgeorge | 134/15 |
| 5,610,516 A | * | 3/1997 | Maier | 324/226 |
| 5,681,131 A | * | 10/1997 | Goldenberg et al. | 405/183.5 |
| 6,314,795 B1 | * | 11/2001 | Ingham | 73/49.1 |
| 6,931,952 B2 | * | 8/2005 | Rantala et al. | 73/866.5 |
| 7,246,031 B2 | * | 7/2007 | Boudreaux | 702/152 |
| 7,331,215 B2 | * | 2/2008 | Bond | 73/40.5 A |
| 7,523,666 B2 | * | 4/2009 | Thompson et al. | 73/592 |
| 2003/0121338 A1 | * | 7/2003 | Yates | 73/865.8 |
| 2003/0160391 A1 | * | 8/2003 | McEwan | 277/314 |

(Continued)

*Primary Examiner* — David A Rogers

(74) *Attorney, Agent, or Firm* — Nixon & Vanderhye P.C.

(57) ABSTRACT

A system and process for detecting the place of leakage from umbilical hoses. This system includes an internal device (PIG) which is inserted in the hose of the umbilical cable which is leaking and external detecting equipment which is intended to identify the position of the PIG device which is already inside the umbilical. The device which is inserted in the umbilical and which is known as a PIG, is made of metal and the external detecting equipment comprises two parts: one formed by a ring which surrounds the umbilical, having a sensor system and another part which has the electronics, capable of identifying the presence of the PIG and, with this, modifying the signal, so that it can be identified. The system is presented as a process for detecting the exact place of leakage from umbilical hoses and the technology tested is easy to operate and the inspection is carried out at a good speed and continuously, without creating waste.

9 Claims, 1 Drawing Sheet

(56) References Cited

U.S. PATENT DOCUMENTS

| | | |
|---|---|---|
| 2007/0131297 A1 | 6/2007 | Spaolonzi et al. |
| 2008/0179522 A1* | 7/2008 | Vallon et al. ............... 250/336.1 |
| 2009/0248324 A1* | 10/2009 | Hamilton et al. ............... 702/47 |

* cited by examiner

SYSTEM AND PROCESS FOR DETECTING LEAKAGE IN UMBILICALS

FIELD OF THE INVENTION

This invention relates to a system and process for detecting the place of leakage from umbilical hoses. This leakage detection system comprises a device which is inserted in the hose which is leaking and external detecting equipment which is intended to identify the position of this device which is already inside the umbilical.

The system is also presented as a process for detecting the exact place of leakage from umbilical hoses where the starting point is the identification of the leakage during operation, removal of the umbilical with subsequent introduction of the device into the leaking hose, transfer from reel to an inspection sector and location of the point of leakage.

PRIOR ART

Umbilical cables have been put on the market with the aim of having a life, in general, exceeding 15 years. However, the manufacturer's legal liability with regard to the equipment sold in Brazil is, at present, for only five years from the discovery of the impairment of, damage to or defect in the equipment, preventing customers, after this period, from recovering any financial loss and/or environmental damage arising from failure in operation. Considering the effects of wear between layers and fatigue damage promoted by the passage of extreme fluids or loads, a system is necessary for detecting leaks in the hoses which form part of an umbilical cable.

The increase in the use of submarine production systems has involved greater use of umbilical cables. The structure of this equipment comprises several concentric layers, these being polymeric and/or metal. Umbilicals comprise thermoplastic hoses and electrical cables, integrated in a single cable, and are intended for transmission of hydraulic and electrical energy, signals or even for making possible the injection of chemical products in various different applications so as to link the ocean surface with the ocean floor, where it is [sic] connected to various equipment such as valves and other systems existing at the bottom of the sea. These umbilicals can be used in oil and gas marine product systems, among other uses. They can range from short to many kilometers long, being most commonly found in lengths of many kilometers.

The PIG is a cylindrical or spherical device designed and used originally for the purpose of cleaning the insides of pipelines. It can range from a simple cylinder made of foam even to a more complex device like a cylindrical metal structure (chassis) which uses a transverse disc as a guide and seal.

According to PI 0601090-3, a system and method are suggested for detecting leakage in fluid transport pipes, the said system and method being intended to monitor and detect any leakage in any kind of pipe which transports inside it any kind of fluid which contains constituent elements capable of converting to radioactive tracing elements. The system basically comprises a plurality of neutron emitters and a plurality of gamma radiation detectors spaced, intercalated and fitted on the external surface of a transport pipe, along its length. This solution has disadvantages, as it uses radioactive material, in that restriction of operation occurs with material harmful to human health, it requires complex logistics for acquiring the equipment for its operation, restriction of the times of inspection and isolation of the area for control of access, in addition to being used in kinds of pipes which are more rigid for transporting fluid and not for umbilical cable hoses.

PI 0604996-6 describes a system and method for detecting leakage for offshore hose lines, where a fluid leakage detector is provided for a segment of double-carcass hose line which includes a sensor housing defined by side walls mounted externally to the hose line continuation and having an internal housing chamber communicating with the collection space. An optical sensor is mounted through at least one sensor housing side wall and positions an optical sensing element device inside the sensor housing chamber for detection of the presence of fluid in the hose collection space. This suggestion is limited to application in a double-carcass hose for petroleum loading and unloading offshore fluid transport, i.e. hose leakage detection systems set up in the context of these loading and unloading terminals.

With the technology tested, relating to the patent application suggested, it is possible to detect leaks in umbilical cable hoses, the said technology does not involve harm to human health and inspection is carried out at a good speed and continuously. This technology does not create waste and is easy to operate.

SUMMARY OF THE INVENTION

A system and process has been developed for detecting leakage in an umbilical. This system comprises a metal device (PIG) which can comprise one or more parts, which is inserted in the hose which is leaking and external detecting equipment which is intended to identify the position of the device (PIG) which is already inside the umbilical. The system is presented as a process for detecting the exact place of leakage from umbilical hoses in which the starting point is the identification of the leakage during operation and, from this point, the umbilical is removed from the field and is transported to the test site. After removal of the umbilical, a device is introduced into the leaking hose, the reel (or spool) with the umbilical is transferred to the inspection sector and subsequently the point of leakage is located. From this point, the umbilical is sent for repair, where the point of leakage is cut out and the parts are utilized, depending on their final length. The result obtained provides benefits such as economy and utilization of umbilicals.

BRIEF DESCRIPTION OF THE DRAWINGS

The features of the system and process for detecting leakage in an umbilical, which are the objects of this invention, will be better observed from the detailed description below, associated with the drawings referenced below, which are an integral part of this specification.

DETAILED DESCRIPTION OF THE INVENTION

The detailed description of the system and process for detecting leakage in an umbilical, which are the objects of this invention, will be given in accordance with the identification of the components forming it, based on the description of the illustrations above.

A system and process for detecting the place of leakage from umbilical hoses has been developed which refers to a leakage detection system comprising an internal device which is inserted in the hose which is leaking and external detecting equipment which is intended to identify the position of the former which is already inside the umbilical.

Figure 1:
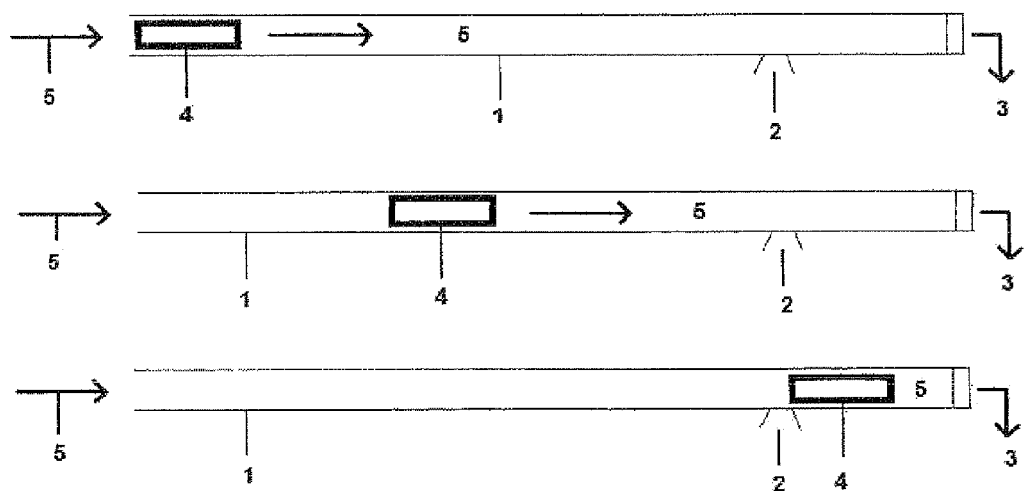
FIG. 1 is a schematic representation of the umbilical leakage detection system of a section of the hose belonging to the umbilical, with the use of an internal "PIG" device.

The umbilical in which it is required to identify the exact place where there is leakage from one of its hoses must be out of service and removed FIG. 1 illustrates the process of detecting leakage from a hose (1) in the umbilical where, once the umbilical hose (1) which has a leak (2) has been identified, the said hose must have one of its ends closed (plugged) (3) or completely sealed. The metal device, called a PIG (4), which can comprise one or more parts, is then inserted and hydrostatic pressure is applied with water (5) or any other fluid with which this operation can be carried out, with or without control of the injection pressure.

This operation is intended to displace the PIG (4), as the leak (2) will allow the displacement of the mass of fluid introduced into the hose (1), which mass displaces the PIG (4) up to the place of leakage (2) as, after the leak, there is no displacement of the mass of fluid (5) because, from there, this hose is closed (3), blocked and completely sealed. After a fall in the injection (5) pressure has been detected or after some injection time, the PIG (4) immediately comes to a stop after the position of the leak.

Figure 2:
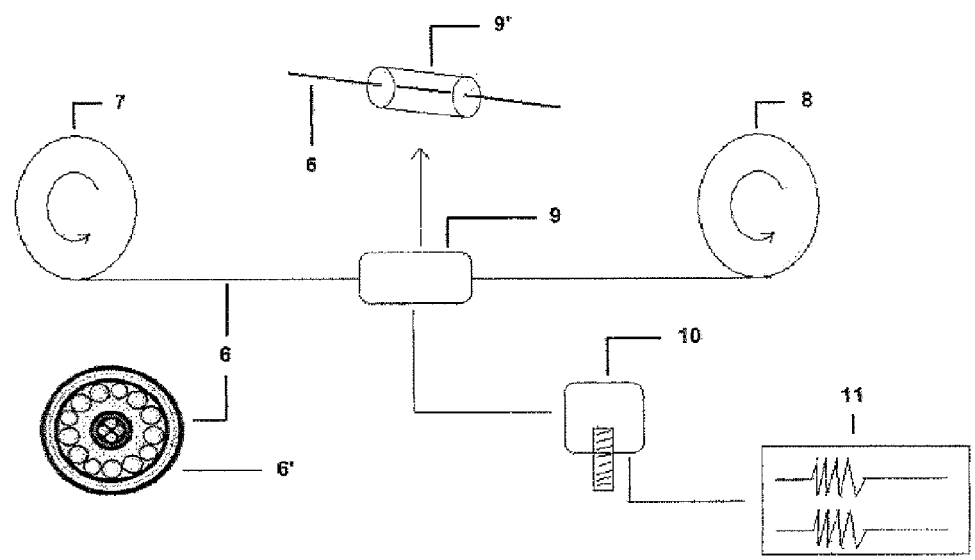
FIG. 2 is a schematic representation of the system for detecting the stoppage of the PIG in the region of the leak in the umbilical hose with transfer from one reel to another, using the external detecting equipment.

The injection of fluid into the hose (1) is then stopped and the umbilical (6) (in cross section view (6')) is transferred from one reel (7) to another (8), being passed through the PIG detection device (9), as illustrated in FIG. 2. When the section of umbilical where the PIG is situated passes through, the system detects its presence.

Again in accordance with FIG. 2, the external equipment for detecting the PIG in the umbilical comprises two parts, one formed by a ring (9') which surrounds the umbilical, having a sensor system and another part which has the electronics (10), capable of identifying the presence of the PIG and, with this, modifying the signal (11) so that it can be identified.

The exact place of leakage from the umbilical hose then being detected, a cut is made in the umbilical, with subsequent repair and thus the region which had the leak is removed and, depending on the lengths involved, use of the remaining parts is made possible, saving time and financial resources, i.e. their reuse. In spite of having been severed, it can be repaired again with the minimum loss in relation to its total length or the remaining parts can even be used in other work.

The starting point for the process of detecting leakage from a hose in an umbilical was the identification of the leakage during operation. From this point, the sequence below is followed:

Removal of the umbilical from the field and transport to the test site,
Introduction of the device(s) into the leaking hose(s),
Transfer of the reel (or spool) to the inspection sector and
Location of the point with the leak.

From this point, the umbilical is sent for repair, in which the point of leakage is cut out and the parts are utilized in accordance with their final length.

The devices were located, with precision of 50 cm, in a test which took approximately 40 minutes after preparation of the site.

The result obtained represents good prospects for utilizing umbilicals. At present, there are in operation approximately 1,850 km of umbilicals installed in offshore activities. Considering that these problems occur in approximately 30% of these components (a percentage obtained through a survey conducted within a large operator of this equipment) and considering it were possible to use only 70% of their original length, we would be saving in excess of 380,000 meters of umbilicals.

We claim:

1. A system for detecting the place of leakage in an umbilical hose comprising:
    a test site at a predetermined location to receive a leaking umbilical hose;
    a metal PIG device adapted to be inserted in an opened end of a leaking umbilical hose while an opposite end of the umbilical hose is closed;
    a source of pressurized fluid at the test site connectable to the opened end of the leaking umbilical hose, wherein the source of pressurized fluid applies hydrostatic pressure to propel the metal PIG device through the hose to a position adjacent the leak in the hose, and
    an external metal detector at the test site adapted to locate the metal PIG device in the umbilical hose and identify the location of the metal PIG device in the hose when adjacent the leak.

2. The system according to claim 1 wherein the pressurized fluid is water.

3. The system according to claim 1 wherein the external metal detector comprises a sensor system ring which surrounds the hose, and an electronics unit adapted to generate a signal indicative of the presence of the metal PIG device in the hose.

4. A method to detect a leak in an umbilical hose comprising:
    determine that a leak has occurred in the umbilical hose;
    move the umbilical hose to a test site after the determination of the leak;
    insert a metal PIG device in an open end of the umbilical hose at the test site;
    propel the metal PIG device through the leaking umbilical hose by injection of a fluid into the open end of the leaking umbilical hose and behind the metal PIG device while an opposite end of the umbilical hose is closed;
    monitoring a pressure of the fluid propelling the metal PIG device through the leaking umbilical hose and detecting an abrupt decrease in the pressure of the fluid, wherein the abrupt decrease causes the metal PIG device to stop in the leaking umbilical hose at a location proximate to the leak in the hose;
    in response to the detection of the abrupt decrease in the pressure, ceasing the injection of the fluid into the open end of the umbilical hose;
    after ceasing the injection of the fluid, transferring the umbilical hose to a test station having a metal detector;
    at the test station, moving the hose with the stopped metal PIG device through a ring shaped portion of the metal detector;
    monitoring a signal generated by the metal detector, wherein the signal is indicative of a presence of the metal PIG device in the hose at a location of the hose in the ring shaped portion of the metal detector; and
    identifying a location on the hose at which the ring shaped detector generates the signal indicating the presence of the metal PIG device in the hose.

5. A system for detecting the place of leakage in umbilical hoses which comprises:
    a metal PIG device adapted to be inserted in an opened end of a leaking umbilical hose while an opposite end of the hose is closed, a source of pressurized fluid connectable to the opened end of the leaking umbilical hose, wherein said metal PIG device is propelled to a position immediately after a leakage point in the hose by hydrostatic pressure provided by the injection of the pressurized fluid into the opened end of the leaking umbilical hose, and while the opposite end is closed;

a reel to reel hose transfer assembly, and an external metal detecting equipment adapted to identify the position of the metal PIG device and consequently the leakage point, wherein the external metal detecting equipment is between the reels of the reel to reel hose transfer assembly.

6. The system according to claim 5 wherein the fluid is water.

7. The system according to claim 5 wherein the external metal detecting equipment comprises a sensor system ring which surrounds the hose, and an electronic sensor that identifies a presence of the metal PIG device when the signal is modified.

8. A method to detect a leak in an umbilical hose which comprises:

identify leakage in an umbilical hose during operation;

move the leaking umbilical hose to a test site;

insert a metal PIG device in one opened end of a leaking hose while its other end is closed;

move the metal PIG device to a position adjacent a leakage point by propelling the metal PIG device with a fluid injected in the opened end of the leaking hose and behind the metal PIG device and while the other is closed;

stop the injection of the fluid after an abrupt drop in the injection pressure is detected, wherein the abrupt drop corresponds to the cessation of the movement of the metal PIG device at the leakage point;

mount the hose with the stopped metal PIG device to a reel to reel hose transfer assembly;

move the hose with the from one reel to another reel to pass the hose through a ring shaped portion of an external metal detecting equipment, wherein the hose is moved with the metal PIG device adjacent the leakage point;

detect the leakage point by identifying the position of the metal PIG device inside the hose, wherein the detection is based on a change in a signal generated by the external metal detecting equipment which monitors the hose as the hose moves through the ring shaped portion of the external metal detecting equipment.

9. A method to detect a leak in an umbilical hose which comprises:

inserting a metal PIG device in an open end of the umbilical hose;

injecting a pressurized fluid into the open end of the hose to propel the metal PIG device through the hose while an end of umbilical hose opposite to the open end is closed;

detecting a pressure drop in the pressurized fluid, wherein the pressure drop occurs as the metal PIG device moves past the leak in the umbilical hose;

the metal PIG device stops moving through the umbilical hose at a position adjacent the leak;

cease the injection of the pressurized fluid in response to the detection of the pressure drop;

mount the umbilical hose to a reel, wherein the metal PIG device remains stopped adjacent the leak in the umbilical hose on the reel;

move the umbilical hose through a ring shaped portion of a metal detector as the hose is transferred from the reel to another reel, and determine a leak location on the hose as position of the metal PIG device as detected by the metal detection device.

* * * * *